(12) United States Patent
Yang et al.

(10) Patent No.: US 12,249,318 B2
(45) Date of Patent: Mar. 11, 2025

(54) INTERACTION METHOD, DEVICE, STORAGE MEDIUM AND OPERATING SYSTEM

(71) Applicant: Alibaba Group Holding Limited, Grand Cayman (KY)

(72) Inventors: Yang Yang, Beijing (CN); Xinzheng Li, Hangzhou (CN); Kai Wang, Beijing (CN); Zhijun Yuan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 446 days.

(21) Appl. No.: 17/187,375

(22) Filed: Feb. 26, 2021

(65) Prior Publication Data

US 2021/0183371 A1 Jun. 17, 2021

Related U.S. Application Data

(63) Continuation of application No. PCT/CN2019/102560, filed on Aug. 26, 2019.

(30) Foreign Application Priority Data

Aug. 29, 2018 (CN) .......................... 201810997878.5

(51) Int. Cl.
*G06F 15/00* (2006.01)
*G06F 40/30* (2020.01)
(Continued)

(52) U.S. Cl.
CPC .............. *G10L 15/08* (2013.01); *G06F 40/30* (2020.01); *G10L 25/51* (2013.01)

(58) Field of Classification Search
None
See application file for complete search history.

(56) References Cited

U.S. PATENT DOCUMENTS 9,432,495 B2 8/2016 Moore
9,812,126 B2 11/2017 Khan et al.
(Continued)

FOREIGN PATENT DOCUMENTS

| CN | 107977183 | 11/2017 |
| CN | 107491468 B | 12/2017 |
| CN | 108279839 | 7/2018 |

OTHER PUBLICATIONS

English Translation of Chinese office action and search report for corresponding Chinese application No. 201810997878.5 dated Mar. 31, 2023, 6 pages.
(Continued)

*Primary Examiner* — Satwant K Singh
(74) *Attorney, Agent, or Firm* — Lee & Hayes, P.C.

(57) ABSTRACT

A method including in response to voice information, acquiring a response object to which corresponding voice information is registered and which occupies an interactive medium; and informing the response object to respond to the voice information. The technical solution enables an operating system to automatically determine a response object responding to voice information triggered by a user from numerous response objects in view of voice information registered at each response object and the occupation of interactive media by each response object. The technical solution removes the restriction that a user must speak a wakening phrase to activate a required response object each time before speaking voice information. Thus, a user only needs to speak short voice information that shows the intention for use thereof during a process of using a certain response object, thereby improving the convenience of a user performing voice interaction.

20 Claims, 9 Drawing Sheets

DETERMINE REGISTRATION INFORMATION OF RESPONSE OBJECT, WHICH CONTAINS VOICE INFORMATION AND IDENTIFICATION OF RESPONSE OBJECT
102

↓

SEND REGISTRATION INFORMATION TO OPERATING SYSTEM SO THAT OPERATING SYSTEM RESPONDS TO AND PROCESSES VOICE INFORMATION TRIGGERED BY USER ACCORDING TO REGISTRATION INFORMATION
104

(51) Int. Cl.
  *G10L 15/08*  (2006.01)
  *G10L 25/00*  (2013.01)
  *G10L 25/51*  (2013.01)

(56) References Cited

U.S. PATENT DOCUMENTS

| | | | |
|---|---|---|---|
| 9,972,320 | B2 | 5/2018 | Melendo Casado et al. |
| 9,984,687 | B2* | 5/2018 | Han .................. G10L 21/10 |
| 10,013,985 | B2 | 7/2018 | Yue et al. |
| 10,074,367 | B2 | 9/2018 | Toiyama |
| 10,102,857 | B2 | 10/2018 | Mixter et al. |
| 10,374,816 | B1 | 8/2019 | Leblang et al. |
| 10,621,980 | B2 | 4/2020 | Kim |
| 10,699,711 | B2 | 6/2020 | Reilly et al. |
| 10,978,060 | B2 | 4/2021 | Azam et al. |
| 10,984,794 | B1* | 4/2021 | Kaneko ................ G06F 40/30 |
| 2016/0055849 | A1* | 2/2016 | Watanabe ............ G10L 15/08 |
| | | | 704/235 |
| 2016/0071517 | A1* | 3/2016 | Beaver .................. G06F 40/35 |
| | | | 704/9 |
| 2016/0180853 | A1 | 6/2016 | VanLund et al. |
| 2017/0047064 | A1* | 2/2017 | Kirihara ............. G10L 15/1815 |
| 2017/0168774 | A1* | 6/2017 | Sugita .................... G10L 15/22 |
| 2018/0011687 | A1* | 1/2018 | Imagawa ................ G06F 3/167 |
| 2018/0074785 | A1* | 3/2018 | Ohmura ................ G06F 3/0487 |
| 2018/0107445 | A1* | 4/2018 | Ohmura ................ G10L 25/48 |
| 2018/0254043 | A1* | 9/2018 | Han .................. G06F 16/90328 |
| 2019/0179607 | A1 | 6/2019 | Thangarathnam et al. |

OTHER PUBLICATIONS

Wu et al., Implementation method of Chinese voice interactive GIS based on ArcGIS and Speech SDK, Geography and Geo-information Science, Sep. 15, 2016, pp. 76-80.

Bian et al., Multi-objective based superimposed optimization method for enhancement of I-glutaminase production by Bacillus subtilis RSP-GLU, Karbala International Journal of Modern Science, Jan. 31, 2018.

* cited by examiner

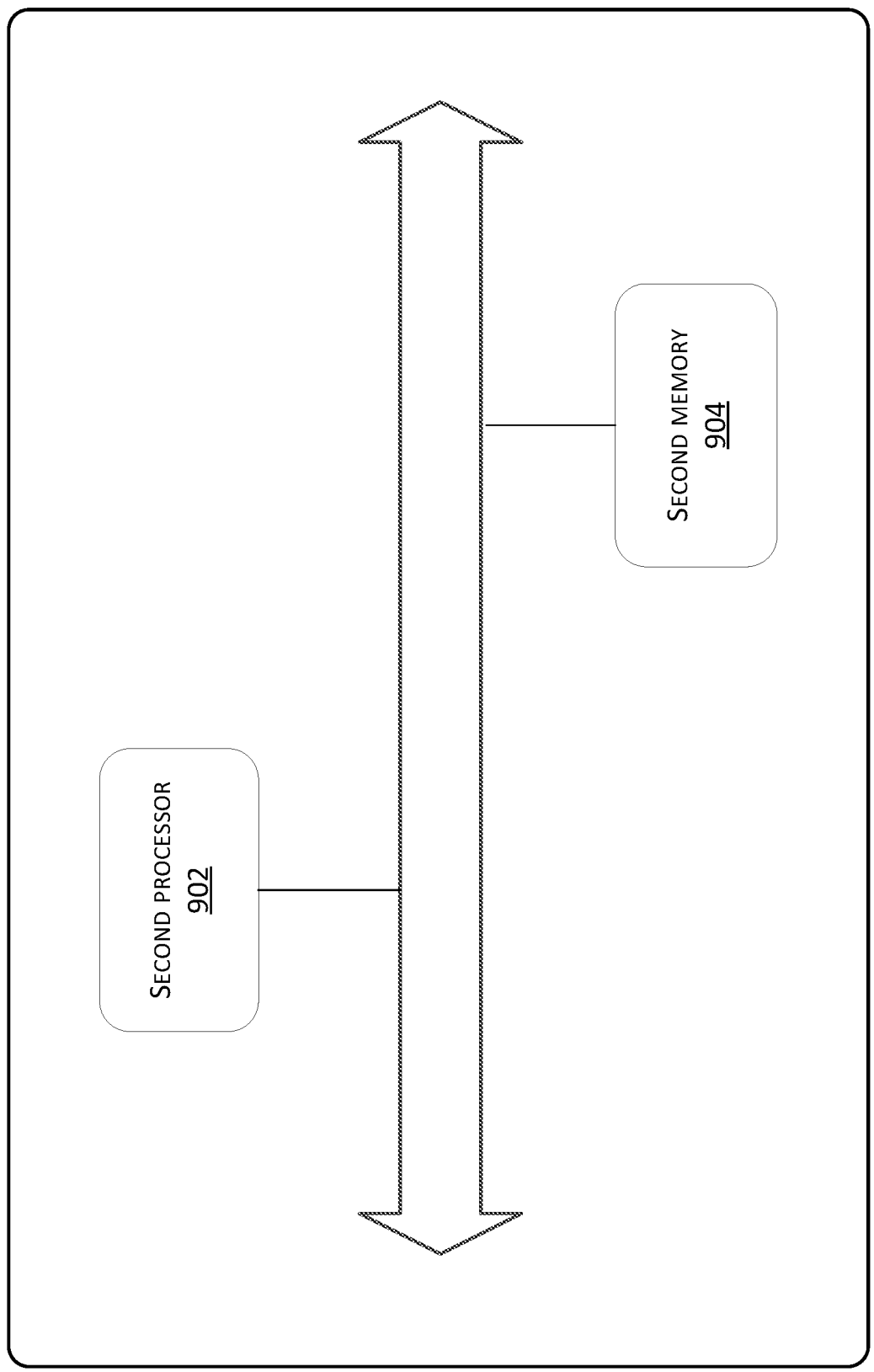

INTERACTION METHOD, DEVICE, STORAGE MEDIUM AND OPERATING SYSTEM

CROSS REFERENCE TO RELATED APPLICATIONS

This application claims priority to and is a continuation of PCT Patent Application No. PCT/CN2019/102560, filed on 26 Aug. 2019 and entitled "INTERACTION METHOD, DEVICE, STORAGE MEDIUM AND OPERATING SYSTEM," which claims priority to Chinese Patent Application No. 201810997878.5, filed on 29 Aug. 2018 and entitled "INTERACTION METHOD, DEVICE, STORAGE MEDIUM AND OPERATING SYSTEM," which are incorporated herein by reference in their entirety.

TECHNICAL FIELD

The present disclosure relates to the field of Internet technologies, and, more particularly, to interaction methods, devices, storage media and operating systems.

BACKGROUND

Voice interaction has gradually become one of the mainstream interaction modes in the field of human-computer interaction. Especially in cases where it is inconvenient for users to perform touch screen operations, the mode of voice interaction provides users with great convenience. For this reason, many application programs, services, and pages provide voice interaction capability. For example, mobile phones are provided with a voice assistant, a music application program, a broadcast application program, a navigation application program, a search engine, etc.

Taking an application program as an example, in order to achieve voice interaction, a plurality of voice events are often registered in advance in the application program. A voice event may contain voice information and a response processing logic. When a voice spoken by a user is received and recognized, a response is given according to the response processing logic corresponding to the voice information. However, in fact, different application programs may register the same voice information. For example, voice information "Next" is registered in a music application program and is also registered in a broadcast application program. The response processing logic corresponding to the voice information "Next" in the music application program is to play a next song, and the response processing logic corresponding to the voice information "Next" in the broadcast application program is to switch to a next broadcast channel.

In order to avoid the conflict caused by registration of the same voice information in different application programs, a solution in conventional techniques is that each time before a user uses an application program, the user needs to wake the current application program to be used, and then speak a phrase containing voice information, so that the application program responds to the user's voice information. For example, supposing the wakening phrase of an application program is "Hello, Xiao Le," the user needs to say the wakening phrase "Hello, Xiao Le" first, then the application program is started, and then the user says voice information "Next." The application program will respond to the user's voice information "Next"; after a period of time, a few minutes for example, even if the application program does not exit, if the user wants to continue to use the application program, the user still needs to say the wakening phrase "Hello, Xiao Le" first and then say the voice information "I want to listen to Andy Lau's songs."

This method of waking the application program that needs to be used before the user wants to perform voice interaction, and then outputting voice information, is complex in operation. Especially when the user needs to switch between different application programs, the user has to speak a long phrase to perform voice interaction, which may not meet the user's need of quickly implementing voice interaction through simple voice information.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the technical problem, embodiments of the present disclosure provide interaction methods, devices, storage media and operating systems to improve the convenience of voice interaction.

An embodiment of the present disclosure provides an interaction method, applied to an operating system. The method comprises:

in response to voice information, determining a response object to which corresponding voice information is registered and which occupies an interactive medium; and informing the response object to respond to the voice information.

An embodiment of the present disclosure provides an interaction device, applied to an operating system, comprising:

a determining module, used for, in response to voice information, determining a response object to which corresponding voice information is registered and which occupies an interactive medium; and a sending module, used for informing the response object to respond to the voice information.

An embodiment of the present disclosure provides an electronic device, comprising a first memory and a first processor. An executable code is stored in the first memory, and when the executable code is executed by the first processor, the first processor will implement the foregoing interaction method.

An embodiment of the present disclosure provides a non-transitory machine-readable storage medium, an executable code is stored in the non-transitory machine-readable storage medium, and when the executable code is executed by the processor of the electronic device, the processor will implement the foregoing interaction method.

An embodiment of the present disclosure provides an interaction method, applied to a response object. The method comprises:

determining registration information of a response object, which contains voice information and an identification of the response object; and sending the registration information to an operating system so that the operating system responds to received voice information according to the registration information.

An embodiment of the present disclosure provides an interaction device, comprising:

a determining module, used for determining registration information of a response object, which contains voice information and an identification of the response object; and a sending module, used for sending the registration information to an operating system so that the operating system responds to and processes received voice information according to the registration information.

An embodiment of the present disclosure provides an electronic device, comprising a second processor and a second memory. An executable code is stored in the second memory, and when the executable code is executed by the second processor, the second processor will implement the interaction method described in the foregoing fourth aspect.

An embodiment of the present disclosure provides a non-transitory machine-readable storage medium, an executable code is stored in the non-transitory machine-readable storage medium, and when the executable code is executed by the processor of the electronic device, the processor will implement the interaction method described in the foregoing fourth aspect.

An embodiment of the present disclosure provides an operating system, comprising:

an input control unit, used for controlling a voice input device to receive voice information; and a processing unit, used for, in response to the voice information, determining a response object to which corresponding voice information is registered and which occupies an interactive medium, and informing the response object to respond to the voice information.

In the embodiments of the present disclosure, when voice information input by a user is received, as there may be a plurality of response objects to which corresponding voice information of the voice information is registered, a response object to which the corresponding voice information is registered and which currently occupies an interactive medium is determined in view of the current occupation of interactive media such as screen windows and audio channels, thereby informing the acquired response object to respond to the voice information. By using the described technical solution, an operating system automatically determines a response object used for responding to voice information triggered by a user from numerous response objects in view of voice information in each response object and the occupation of interactive media by each response object so as to break the limitation by which a user must speak a wakening phrase to activate a required response object each time before speaking voice information. Thus, a user only needs to speak short voice information that shows the intention for use thereof during a process of using a certain response object, thereby improving the convenience of a user performing voice interaction.

BRIEF DESCRIPTION OF DRAWINGS

To describe the technical solutions in the embodiments of the present disclosure more clearly, the following briefly describes the accompanying drawings. Apparently, the accompanying drawings in the following description merely show some instead of all embodiments of the present disclosure, and a person of ordinary skill in the art may still derive other drawings from these accompanying drawings without creative efforts.

FIG. 9 is a schematic structure diagram of an electronic device corresponding to the voice interaction device provided by the embodiment shown in FIG. 8.

DETAILED DESCRIPTION

Figure 1:
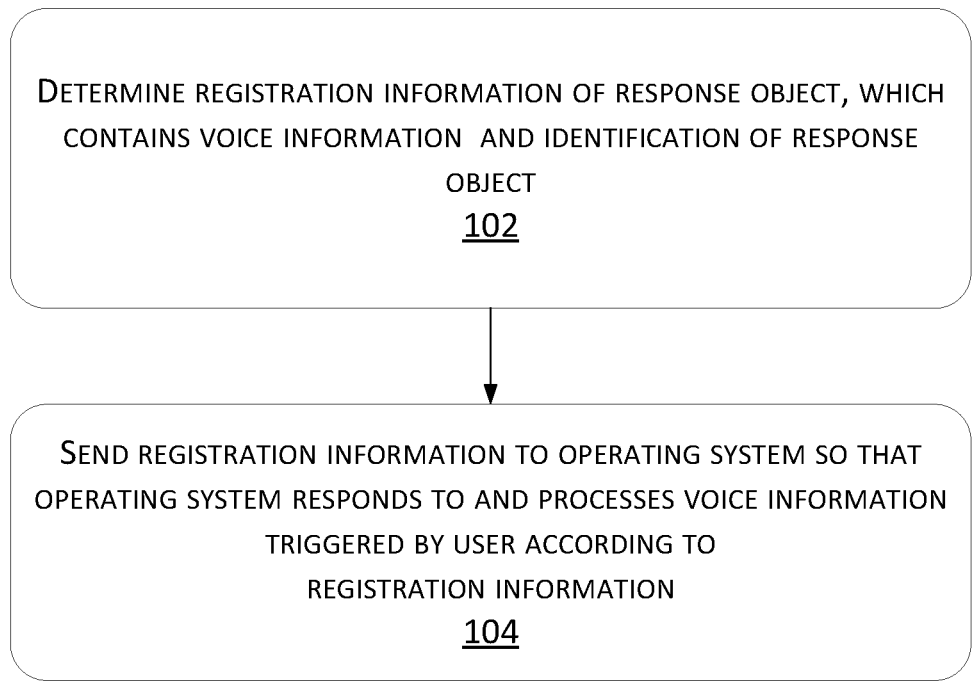
FIG. 1 is a flowchart of a voice interaction method provided by an embodiment of the present disclosure.

In order to make the object, technical solutions, and advantages of the embodiments of the present disclosure clearer, the technical solutions in the embodiments of the present disclosure will be described clearly and completely hereinafter in conjunction with the drawings in the embodiments of the present disclosure. The described embodiments are some, rather than all, of the embodiments of the present disclosure; all other embodiments obtained by a person of ordinary skill in the art based on the embodiments of the present disclosure without creative efforts fall within the protection scope of the present disclosure.

The terms used in the embodiments of the present disclosure are for the purpose of describing specific embodiments only and are not intended to limit the present disclosure. Unless otherwise noted in the context, the singular forms "a," "an," "the" and "said" used in the embodiments and appended claims of the present disclosure are also intended to represent plural forms thereof "A plurality of" generally includes at least two.

It should be appreciated that the term "and/or" used herein is merely an associative relationship describing associated objects, indicating that there may be three relations; for example, A and/or B may indicate the following three cases: A exists individually, A and B exist simultaneously, and B exists individually. In addition, the character "I" herein generally indicates that the related objects before and after the character form an "or" relation.

Depending on the context, the term "if" as used herein may be interpreted as "when," or "in the case that," or "in response to a determination," or "in response to a detection." Similarly, depending on the context, the phrase "if determined" or "if detected (stated condition or event)" may be interpreted as "when determined" or "in response to a determination," or "when detected (stated condition or event)" or "in response to detecting (stated condition or event)."

It should also be noted that the terms "comprise," "include," or any other variant thereof are intended to encompass a non-exclusive inclusion, so that a product or system that involves a series of elements comprises not only those elements, but also other elements not explicitly listed, or elements that are inherent to such a product or system. In the absence of additional restrictions, an element defined by the phrase "including a . . . " does not exclude the presence of another same element in the product or system that comprises the element.

In addition, the sequence of steps in the following method embodiments is merely exemplary and is not intended to impose a strict limitation.

The core idea of the interaction methods provided by the embodiments of the present disclosure is that for any voice interaction response object (for example, an application program, a cloud service, or a page), the developer may perform registration of voice information for the response object (also known as registration of a voice event, or registration of a voice matching rule), and when the voice information is registered, the registration information may contain the voice information that needs to be registered and an identification of the response object. In addition, for example, the registration information may also contain a user interaction intention corresponding to the voice information, and an identification of an interactive medium that the voice information or the response object needs to occupy. Based on the registration result of the voice information, in practical applications, when an operating system in a device running the response object receives voice information triggered by a user, the operating system will determine corresponding voice information of the voice information from stored registration information, i.e., the voice information that exists in the registration information and corresponds to the voice information triggered by the user. Even if the corresponding voice information has been registered by a plurality of response objects, the operating system may still automatically determine the response object used for responding to the voice information triggered by the user based on the occupation of each interactive medium by each response object, so as to command the response object to respond to the voice information triggered by the user.

Here, different interactive modes often correspond to different interactive media. An interactive medium refers to an input and output device (I/O device) involved in human-computer interaction between a response object, e.g. an application program, and a user. The popular interactive media may be screen windows, audio channels, cameras, etc.

Further, in the embodiments of the present disclosure, because the operating system matches a response object used for responding to voice information triggered by a user from all response objects in view of the occupation of each interactive medium by various response objects, the user does not need to position the required response object by means of a wakening phrase, for example. Therefore, the voice information spoken by the user may be relatively short, without contents including a wakening phrase, the name of the response object, etc., and may only contain the voice information indicating the user interaction intention.

As the interaction method provided in the embodiment of the present disclosure is changed during the registration process of voice information and the process of processing the voice information triggered by the user, the voice interaction method will be introduced from the perspective of these two processes respectively.

FIG. 1 is a flowchart of an interaction method provided by an embodiment of the present disclosure. The voice interaction method may be implemented by a response object. As shown in FIG. 1, the method may include the following steps:

102, determining registration information of a response object, which contains voice information and an identification of the response object.

For example, the registration information may further contain a user interaction intention corresponding to the voice information and an identification of an interactive medium that the response object needs to occupy.

102, sending the registration information to an operating system so that the operating system responds to and processes the voice information triggered by the user according to the registration information.

In practical applications, for example, a response object may start implementing the above steps based on the developer's voice information registration operation. Here, the voice information registration operation may be triggered by the developer for a response object, an application program for example. The purpose of the developer is to register voice information and related parameters of the voice information to the application program. Taking an application program appB as an example, the registration information may contain the following information:

phrase: next
intent: action://next-radio
scene: audio-focus
appId: page://appB
where phrase represents registered voice information—next; intent represents a user interaction intention corresponding to the voice information—next channel; scene represents an interactive medium occupied by appB—audio channel; appId represents an identification of the application program—appB.

Based on this registration information, when the user speaks a phrase "Next," or speaks a phrase semantically similar to the registered voice information "Next," such as "Another one," if the appB occupies an audio channel at the moment, the appB may serve as a target application program responding to the voice information.

Certainly, in practical applications, the developer will also set a response processing logic used for responding to the triggering event when the voice information is triggered. For example: look for a next channel and control the audio player to play the next channel.

After the developer completes the setting, the application program will store the information set by the developer. In this case, the application program may generate the registration information mentioned at step 101, and then send the registration information to an operating system. The operating system stores this registration information.

For example, the timing of implementing step 101 may be based on the developer's voice information registration operation in the foregoing example. Alternatively, when a response object, an application program for example, is installed, or when the installation is completed, the foregoing registration information may be determined from the installation package and provided to the operating system for storing.

It may be understood that in practical applications, it is likely that the same voice information is registered to different response objects; taking an application program appC as an example, registration information may contain the following information:

phrase: next
intent: action://next-photo
scene: window-focus
appId: page://appC

The registration information means that voice information "Next" is also registered under the application program appC, and the user interaction intention corresponding to the voice information in the appC is a next photo, and the interactive medium occupied by the appC is a screen window.

When the operating system receives registration information of each response object, the operating system stores the received registration information, for example may store the registration information in a registration database, or a form, etc.

During the storing process, the operating system may store in a centralized way the registration information corresponding to the same registered voice information according to the registered voice information.

A process in which the operating system responds to and processes voice information triggered by a user based on the registration information of each response object is detailed in the introduction in the following embodiments.

Figure 2:
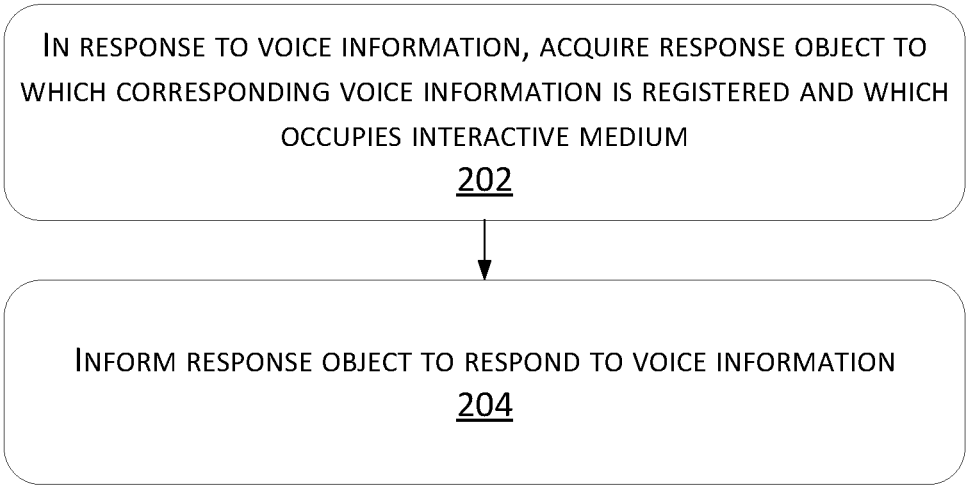
FIG. 2 is a flowchart of another voice interaction method provided by an embodiment of the present disclosure.

FIG. 2 is a flowchart of another voice interaction method provided by an embodiment of the present disclosure. The voice interaction method may be implemented by an operating system. As shown in FIG. 2, the method includes the following steps:

202, in response to voice information, acquiring a response object to which corresponding voice information is registered and which occupies an interactive medium.

204, informing the response object to respond to the voice information.

In practical applications, the operating system may collect a voice triggered by a user through a microphone and then recognize the voice information contained therein, that is, convert the voice into a text, which is used as the foregoing voice information.

After the foregoing voice information is recognized and obtained, corresponding voice information of the voice information is looked for in the stored registration information.

Here, "corresponding" in "corresponding voice information of the voice information" means that the corresponding voice information is the voice information, or the corresponding voice information is semantically similar to the voice information. In other words, the voice information spoken by the user happens to be the voice information contained in specific registration information, or the voice information spoken by the user is semantically similar to the voice information contained in the specific registration information.

For example, supposing the specific registration information contains voice information "Next," if the recognized text is "Next song" or "Next photo," it may be considered to be semantically similar to voice information "Next" in the registration information.

For the convenience of description, the voice information at step 201 is hereinafter referred to as first voice information, and the corresponding voice information is hereinafter referred to as second voice information.

In summary, the operating system may determine each response object to which the second voice information is registered in view of stored registration information. Further, the operating system acquires the occupation of each interactive medium in response to the first voice information triggered by a user, so as to further determine the response object to which the second voice information is registered and which occupies an interactive medium in view of the occupation, and may use the determined response object as a target response object responding to the first voice information triggered by the user, and send a notification to the target response object to inform it of responding to the first voice information.

It is worth noting that the determined response object to which the second voice information is registered and which occupies an interactive medium may be a response object or a plurality of response objects. When there is only one response object, the response object may be directly determined to be a target response object. When there are a plurality of response objects, for example, the plurality of response objects may also be directly determined to all be target response objects, that is, all respond to the first voice information. When there are a plurality of response objects, for example, one of the response objects may be determined to be a target response object according to a specific strategy to respond to the first voice information.

In an example embodiment, if there are at least two response objects to which the second voice information is registered and which occupy an interactive medium, it may be determined that the at least two response objects are all target response objects, and the at least two response objects are informed about responding to the first voice information triggered by the user. Still taking the voice information "Next" that is registered in the appB and the appC in the embodiment shown in FIG. 1 respectively as an example, supposing the voice triggered by the user is voice information "Next" (i.e., the first voice information triggered by the user is same as or semantically similar to "Next," this second voice information), and supposing the appB currently occupies an audio channel and the appC currently occupies a screen window, then the determined at least two response objects contain the appB and the appC. In this case, the appB and the appC may be triggered respectively to respond to the user's voice information, in other words, the appB will play a next channel, and the appC will display a next photo.

In another example embodiment, if there are at least two response objects to which the second voice information is registered and which occupy an interactive medium, and the at least two response objects occupy at least two interactive media in total, then it may be determined according to the priorities of the at least two interactive media that the response object occupying an interactive medium at the highest priority among the at least two response objects is a target response object, and the target response object is informed to respond to the first voice information triggered by the user.

In this embodiment, the operating system may set the priorities of different interactive media in advance. When the foregoing at least two response objects occupy at least two interactive media in total, the interactive medium with the highest priority may be selected from the at least two interactive media currently occupied, so the response object currently occupying the interactive medium with the highest priority is the target response object.

Still taking the voice information "Next" that is registered in the appB and the appC in the embodiment shown in FIG. 1 respectively as an example, supposing the voice triggered by the user is voice information "Next" and supposing the appB currently occupies an audio channel and the appC currently occupies a screen window, then at least two response objects will contain the appB and the appC. And, supposing the screen window enjoys a higher priority over the audio channel, then in this case, it may be determined that the target application program is the appC, which is used to respond to user's voice information to display a next picture.

In this embodiment, when the foregoing at least two response objects currently are all in an operating state, one of them needs to be selected as the target response object. A basis of the selection is: the priority of the occupied interactive medium.

In another example embodiment, if there are at least two response objects to which the second voice information is registered and which occupy an interactive medium, then it may be determined according to the time of occupation of the corresponding interactive medium by the at least two response objects respectively that the response target last occupying the interactive medium among the at least two response objects is a target response object, and the target response object is informed about responding to the voice information.

In practical applications, the response object last occupying the interactive medium is generally the response object most likely to be used by the user at present. Therefore, regardless of the interactive media occupied by at least two response objects respectively, it may be determined that the response object last occupying the interactive medium is a target response object.

Still taking the voice information "Next" that is registered in the appB and the appC in the embodiment shown in FIG. 1 respectively as an example, supposing the voice triggered by the user is voice information "Next" and supposing the appB currently occupies an audio channel and the appC currently occupies a screen window, then at least two response objects will contain the appB and the appC. And, supposing the time of occupation of the audio channel by the appB is T1, the time of occupation of the screen window by the appC is T2, and T1 is earlier than T2, then it may be determined that the target application program is the appC, which is used to respond to user's voice information to display a next photo.

In summary, when voice information input by a user is received, as there may be a plurality of response objects to which corresponding voice information of the voice information is registered, a response object to which the corresponding voice information is registered and which currently occupies an interactive medium is determined in view of the current occupation of interactive media such as screen windows and audio channels by response objects, thereby informing the determined response object about responding to the voice information. By means of the described solution, an operating system automatically determines a response object used for responding to voice information triggered by a user from numerous response objects in view of voice information in each response object and the occupation of interactive media by each response object so as to break the limitation by which a user must speak a wakening phrase to activate a required response object each time before speaking voice information, a user only needing to speak short voice information that shows the intention for use thereof during a process of using a certain response object, thereby improving the convenience of a user performing voice interaction.

Below, the determination process of the response object in the embodiment shown in FIG. 2 is described in conjunction with two embodiments.

Figure 3:
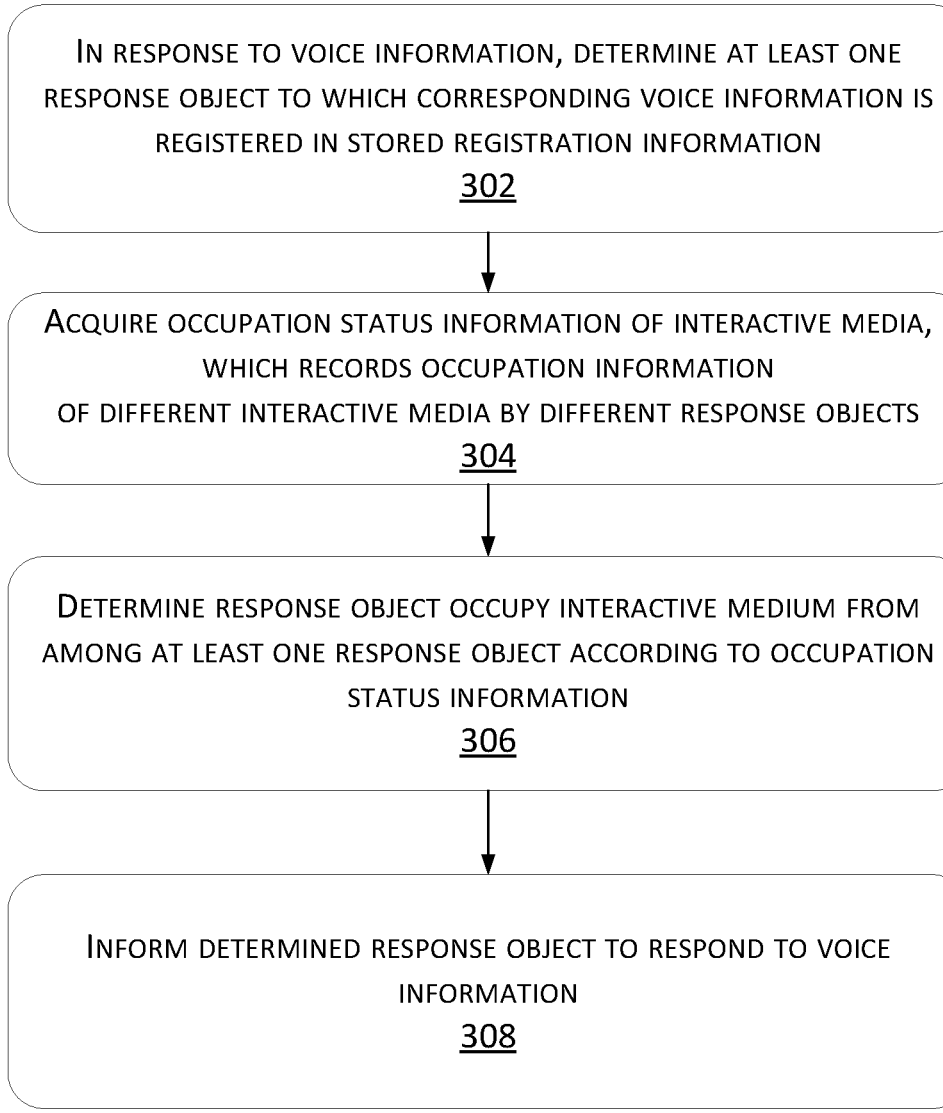
FIG. 3 is a flowchart of a further voice interaction method provided by an embodiment of the present disclosure.

FIG. 3 is a flowchart of a further interaction method provided by an embodiment of the present disclosure. As shown in FIG. 3, the method may include the following steps:

302, in response to voice information, determining at least one response object to which corresponding voice information is registered in stored registration information.

304, acquiring occupation status information of interactive media, which records occupation information of different interactive media by different response objects.

306, determining the response object occupying the interactive medium from at least one response object according to the occupation status information.

308, informing the determined response object to respond to the voice information.

In this embodiment, after voice information (referred to as first voice information) in the voice triggered by the user is recognized, the response objects to which corresponding voice information (referred to as second voice information) of the voice information is registered are found in stored registration information first as the foregoing at least one response object. Supposing that the second voice information is "Next," and the response objects to which the second voice information is registered include appA, appB and appC, then at least one response object is composed of the appA, the appB and the appC.

The operating system maintains occupation status information that reflects the occupation of interactive media by different response objects at different times. The occupation status information may be maintained in a table, which is referred to as an occupation status table. When an interactive medium is occupied by a response object, the occupation information corresponding to the interactive medium may be written into the occupation status table. The occupation information may include, for example, an identification of the interactive medium, an identification of the response object that occupies the interactive medium, and the time of occupation.

Here, the occupation status information of interactive media maintained by the operating system will be updated in real time, that is, the occupation information stored in the occupation status table will be updated in real time. For example, when a response object quits, the response object will release the interactive medium previously occupied by the response object, thereby deleting occupation information of the interactive medium by the response object.

Suppose that after at least one response object is acquired, the operating system queries the occupation status information of the interactive media as follows. Taking the occupation status information of the interactive media stored in the occupation status table as an example, the occupation status table is as shown in the table below:

| Identification of interactive medium | Identification of response object | Time of occupation |
|---|---|---|
| Audio channel | appB | T1 |
| Screen window | appC | T2 |

Therefore, based on the acquired occupation status information of the interactive media, the response object occupying an interactive medium may be determined from at least one response object, that is, the response objects that do not exist in the foregoing occupation status table are removed from the at least one response object.

For example, supposing at least one response object contains appA, appB and appC, and the interactive media corresponding to voice information "Next" in the appA, the appB and the appC respectively are an audio channel, an audio channel and a screen window, respectively, then as the currently acquired occupation status information of interactive media does not have an occupation record of the appA, i.e., the user has not enabled the appA, and only the appB and the appC are currently in an operating state, it is determined that the appB and the appC are response objects to which corresponding voice information is registered and which occupy an interactive medium.

When there are a plurality of response objects to which corresponding voice information is registered and which occupy an interactive medium, the process of determining a target response object used for responding to voice information may refer to the description in the foregoing embodiments, and is not described again here.

A user interaction intention corresponding to voice information in the registered response object may be set during registration of the voice information, so in this embodiment, after the operating system determines a response object to which corresponding voice information is registered and which occupies an interactive medium, the operating system may send a control instruction corresponding to the user interaction intention to the response object according to the user interaction intention corresponding to the corresponding voice information in the response object, to control the response object to give a response. For example, supposing voice information is "Next," the determined response object is appC, and the user interaction intention is: displaying a next photo, then the operating system may send "Display a next photo" control instruction to the appC.

Figure 4:
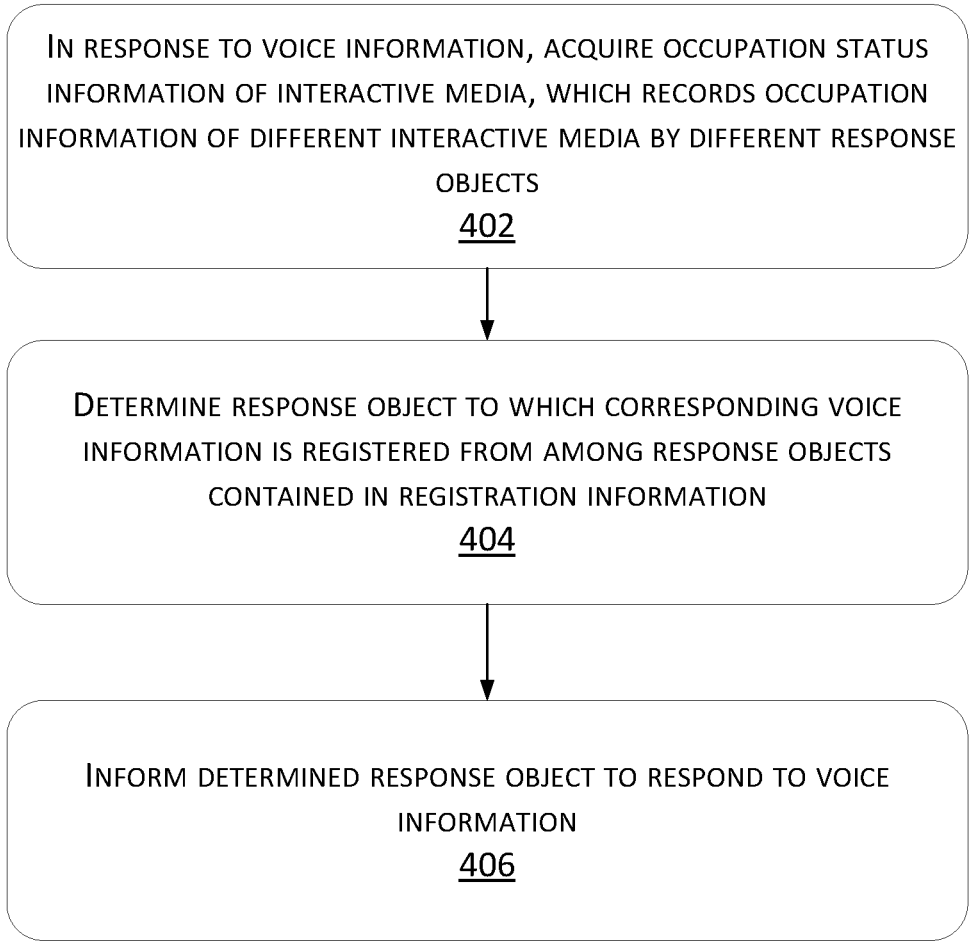
FIG. 4 is a flowchart of a still further voice interaction method provided by an embodiment of the present disclosure.

FIG. 4 is a flowchart of a still further interaction method provided by an embodiment of the present disclosure. As shown in FIG. 4, the method may include the following steps:

402, in response to voice information, acquiring occupation status information of interactive media, which records occupation information of different interactive media by different response objects.

404, determining the response object to which corresponding voice information is registered from the response objects contained in the registration information.

406, informing the determined response object to respond to the voice information.

In this embodiment, after voice information (referred to as first voice information) triggered by the user is acquired, occupation status information of interactive media may be acquired at first, in other words, response objects that are occupying interactive media at present, i.e., the response objects that are being operated, are acquired at first. Then, based on the voice information, response objects to which corresponding voice information (referred to as second voice information) of the first voice information is registered may be determined from the response objects currently recorded in the occupation status information.

For example, suppose the current occupation status information is as shown in the table below:

| Identification of interactive medium | Identification of response object | Time of occupation |
|---|---|---|
| Audio channel | appB | T1 |
| Screen window | appC | T2 |
| Audio channel | appA | T3 |

Supposing the second voice information is "Next," it is determined according to the registration information corresponding to appA, appB and appC, respectively, that the response objects to which the second voice information is registered include the appB and the appC. Therefore, the determined response object to which the second voice information is registered and which occupies an interactive medium is composed of the appB and the appC.

In summary, by setting identifications of response objects in registration information of voice information, and by maintaining the occupation of interactive media, when a user triggers voice information registered to a plurality of response objects, the operating system may also determine a response object used for responding to voice information triggered by the user from all response objects based on the registration information and current occupation status information of interactive media, while the user does not need to designate a target response object before use, thereby improving operation convenience of the user.

Figure 5:
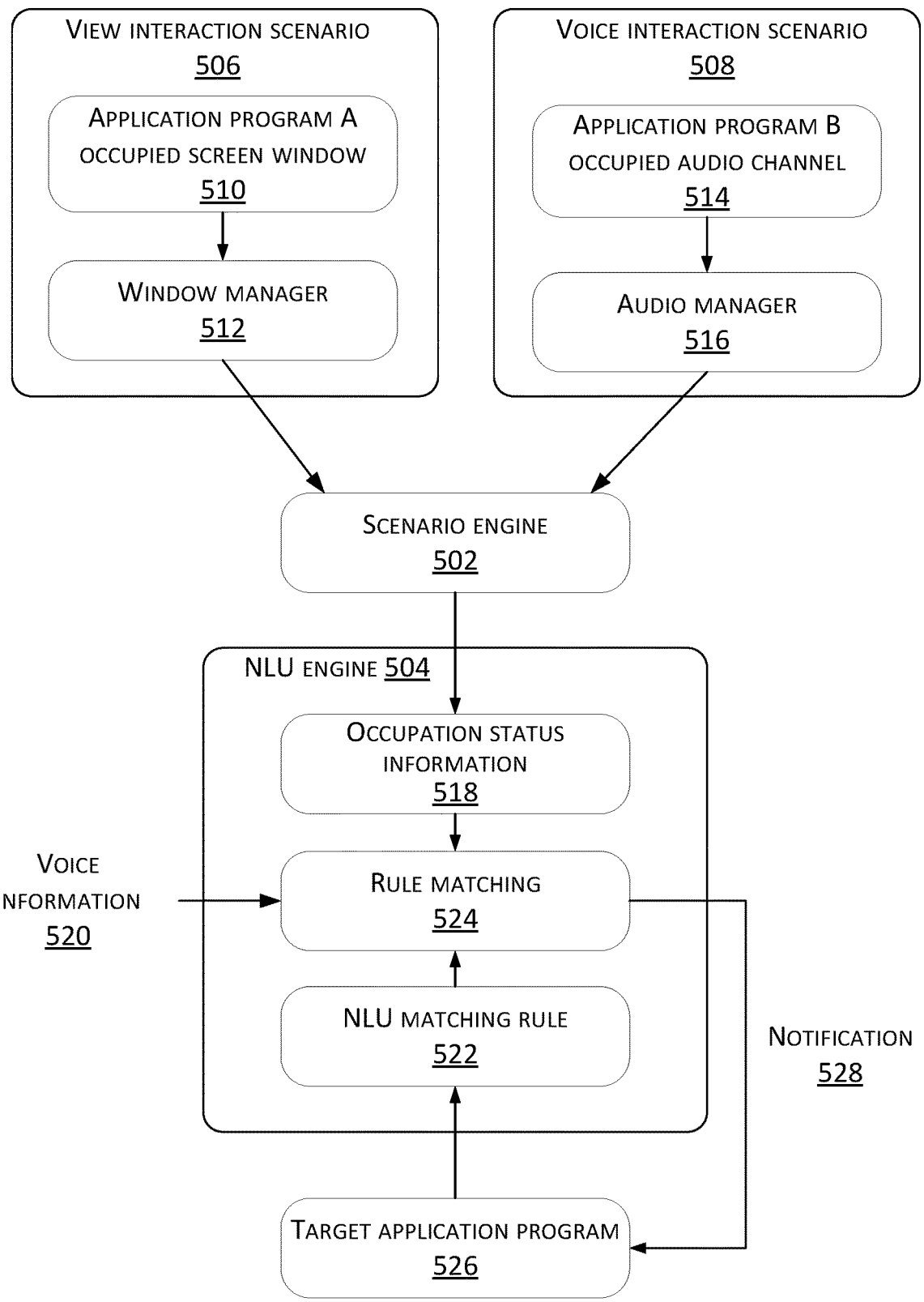
FIG. 5 is a schematic diagram of the working principle of an operating system provided by an embodiment of the present disclosure.

In order to more conveniently understand the registration process of corresponding voice information and the response and processing process of the operating system to the voice information triggered by the user in embodiments of the present disclosure, these processes are described below in conjunction with the schematic diagram of the working principle of the operating system as shown in FIG. 5. It is worth noting that the constituent units shown in FIG. 5 merely show a logically example splitting method, which is not a limitation.

The operating system comprises:
- an input control unit, used for controlling a voice input device to receive voice information; and
- an interaction engine, used for, in response to the voice information, determining a response object to which corresponding voice information is registered and which occupies an interactive medium, and informing the response object to respond to the voice information.

Here, the voice input device may be a microphone. When the operating system is started, the voice input device may be controlled to start working.

In order to support the interaction engine to achieve the acquisition of the occupation of interactive media and the response to and processing of voice information, the interaction engine may be logically divided into a scene engine 502 and a Natural Language Understanding (NLU) engine 504 as shown in FIG. 5. Further, as shown in FIG. 5, the operating system may further comprise interactive medium managers.

Here, one kind of interactive media corresponds to a kind of interactive medium manager, for example, window managers corresponding to interactive media—screen windows, audio managers corresponding to interactive media—audio channels, etc.

Here, every application visible on the screen will have a main window. The window manager is a container that manages all the application windows in the operating system. The window manager ensures that only one application window obtains an input focus at one time, that is, it occupies the screen window.

The audio manager ensures that only one application may occupy the audio channel to play audio at one time.

The scene engine 502 is an engine that manages the use of interactive scenarios such as a view interaction scenario 506 and a voice interaction scenario 508 in the operating system. The view interaction scenario 506 includes an application program A occupied screen window 510 and a window manager 512. The voice interaction scenario 508 includes an application program B occupied audio channel 514 and an audio manager 516.

The scene engine 502 receives the interactive medium occupation status change signals sent by the window manager 512 and the audio manager 516. From the scene engine 502, the occupation status of each interactive medium may be known.

The scene engine 502 may send the occupation status information 518 of each interactive medium obtained in real time to the NLU engine 504, or the scene engine 502 locally maintains the occupation status information 518 of each interactive medium in real-time, and based on the request of the NLU engine 504, sends the occupation status information of each interactive medium to the NLU engine 504 when receiving the request.

In embodiments of the present disclosure, the role of the NLU engine 504 is to convert a voice instruction 520 triggered by a user into a text, and convert the voice instruction 520 (corresponding to the first voice information in the foregoing embodiments) carried in the text into a corresponding user interaction intention. For example, a phrase "I want to go to the West Lake" is processed by the NLU engine 504 and converted into a user interaction intention for navigating to the West Lake. During the operation of the operating system, when the developer wants to register voice information to the application program (corresponding to the second voice information in the foregoing embodiments), registration of the NLU matching rule 522 corresponding to the second voice information may be performed via rule matching 524. For example, the specific registration content may include: the second voice information, the user interaction intention corresponding to the second voice information, identifications of the interactive media that the application program needs to occupy as well as an identification of the application program. Certainly, the developer may also set a callback function that responds to the second voice information. The application program sends the registration information, i.e., the NLU matching rule 522 to the NLU engine 504. The NLU engine stores the NLU matching rule 522.

Based on this, the NLU engine 54 on one hand may maintain the NLU matching rule 522 and on the other hand may obtain real-time occupation status information 518 of each interactive medium through the scene engine 502. Therefore, when a voice instruction 520 triggered by the user is received from the NLU engine 504, the voice information (referred to as first voice information) contained therein is recognized, each NLU matching rule 522 registered with corresponding second voice information is screened, and from the screened matching rules, the target application programs 526 registered with the second voice information, such as application program B, are known. Further, in view of the occupation status information 518 of each interactive medium obtained from the scene engine 502, the target application program 526 used for responding to the voice instruction 520 is determined and notification 528 is sent to the target application program 526 to inform the target application program 526 to respond to the voice instruction 520.

The voice interaction devices in one or more embodiments of the present disclosure will be described in detail below. Those skilled in the art may understand that these voice interaction devices may all be configured and constituted using commercially available hardware components through the steps taught in this solution.

Figure 6:
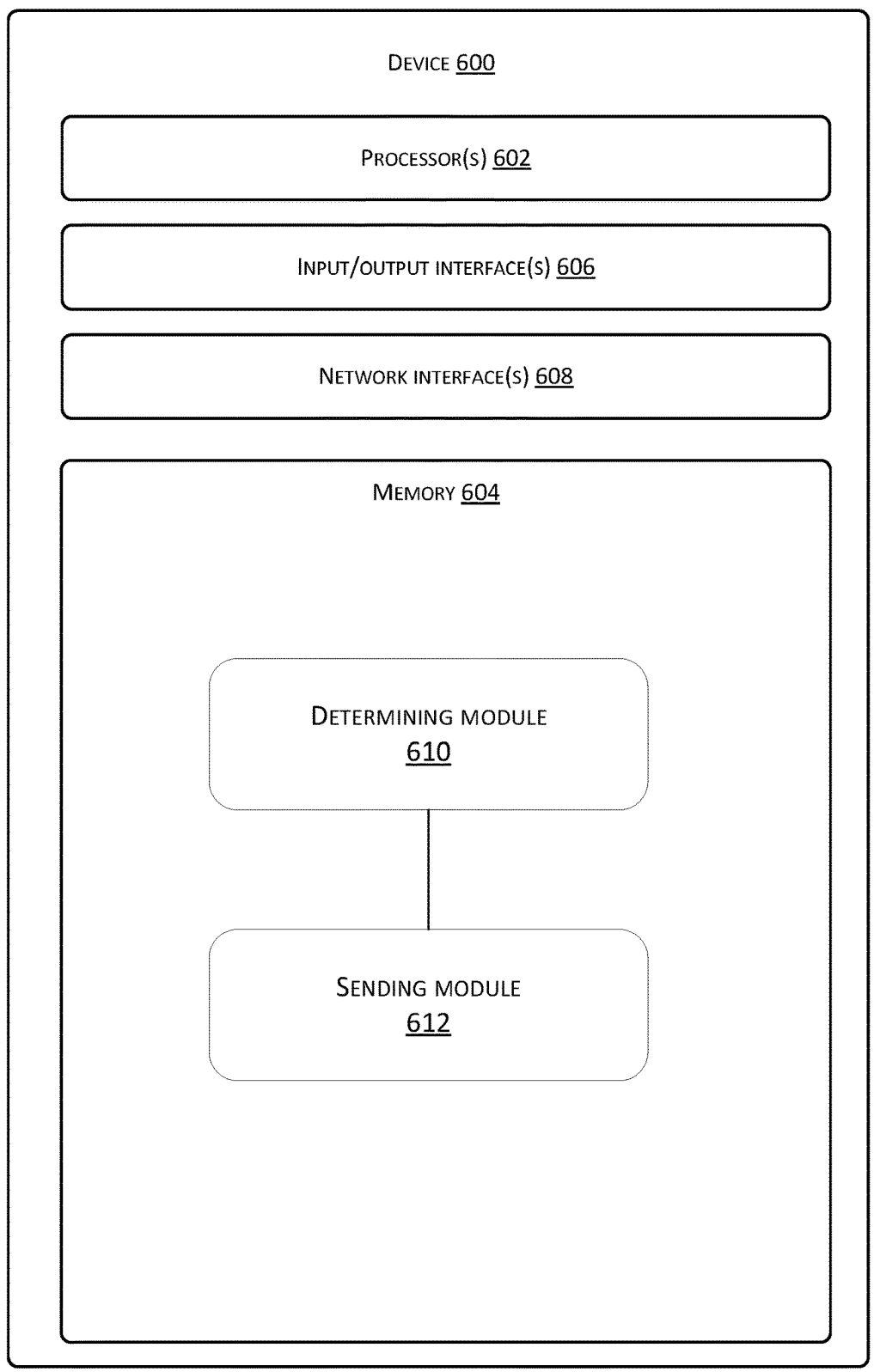
FIG. 6 is a schematic structure diagram of a voice interaction device provided by an embodiment of the present disclosure.

FIG. 6 is a schematic structure diagram of an interaction device provided by an embodiment of the present disclosure. As shown in FIG. 6, the device 600 includes one or more processor(s) 602 or data processing unit(s) and memory 604. The device 600 may further include one or more input/output interface(s) 606 and one or more network interface(s) 608.

The memory 604 is an example of computer-readable media. The memory 604 may store therein a plurality of modules or units including a determining module 610 and a sending module 612.

The determining module 610 is used for determining registration information of a response object, which contains voice information and an identification of the response object.

The sending module 612 is used for sending the registration information to an operating system so that the operating system responds to and processes received voice information according to the registration information.

The device shown in FIG. 6 may implement the method provided by the embodiment shown in FIG. 1. For the parts not described in detail in this embodiment, please refer to the relevant description of the embodiment shown in FIG. 1. The implementation process and technical effects of the technical solution are shown in the description in the embodiment shown in FIG. 1, which will not be described again here.

Figure 7:
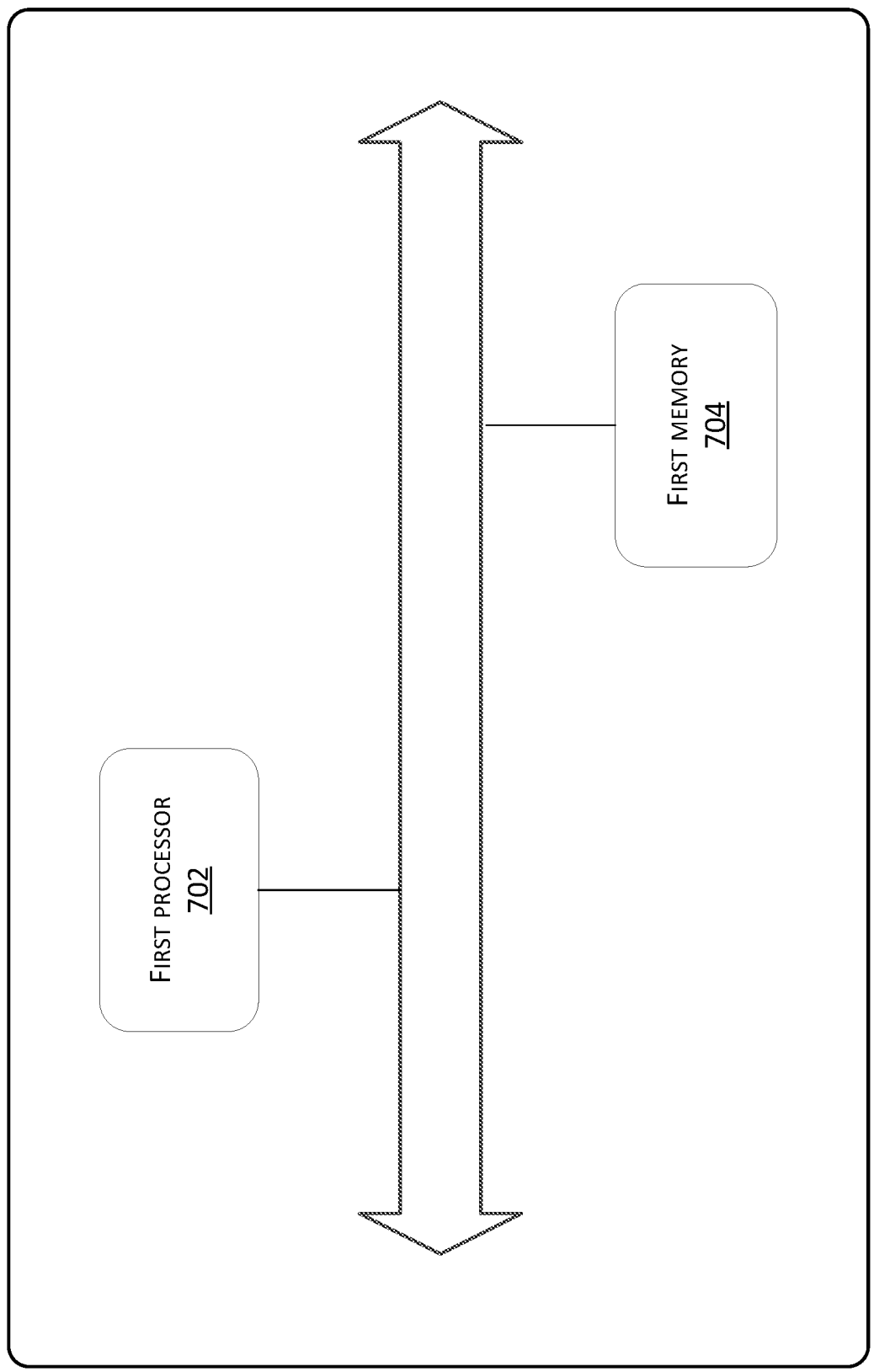
FIG. 7 is a schematic structure diagram of an electronic device corresponding to the voice interaction device provided by the embodiment shown in FIG. 6.

In an example design, the structure of the foregoing interaction device may be implemented as an electronic device, as shown in FIG. 7. The electronic device may comprise: a first processor 702 and a first memory 704. An executable code is stored in the first memory 704. When the executable code is executed by the first processor 702, the first processor 702 will implement the interaction method provided in the embodiment shown in FIG. 1.

Further, an embodiment of the present disclosure provides a non-transitory machine-readable storage medium, an executable code is stored in the non-transitory machine-readable storage medium, and when the executable code is executed by the processor of the electronic device, the processor will implement the interaction method provided in the embodiment shown in FIG. 1.

Figure 8:
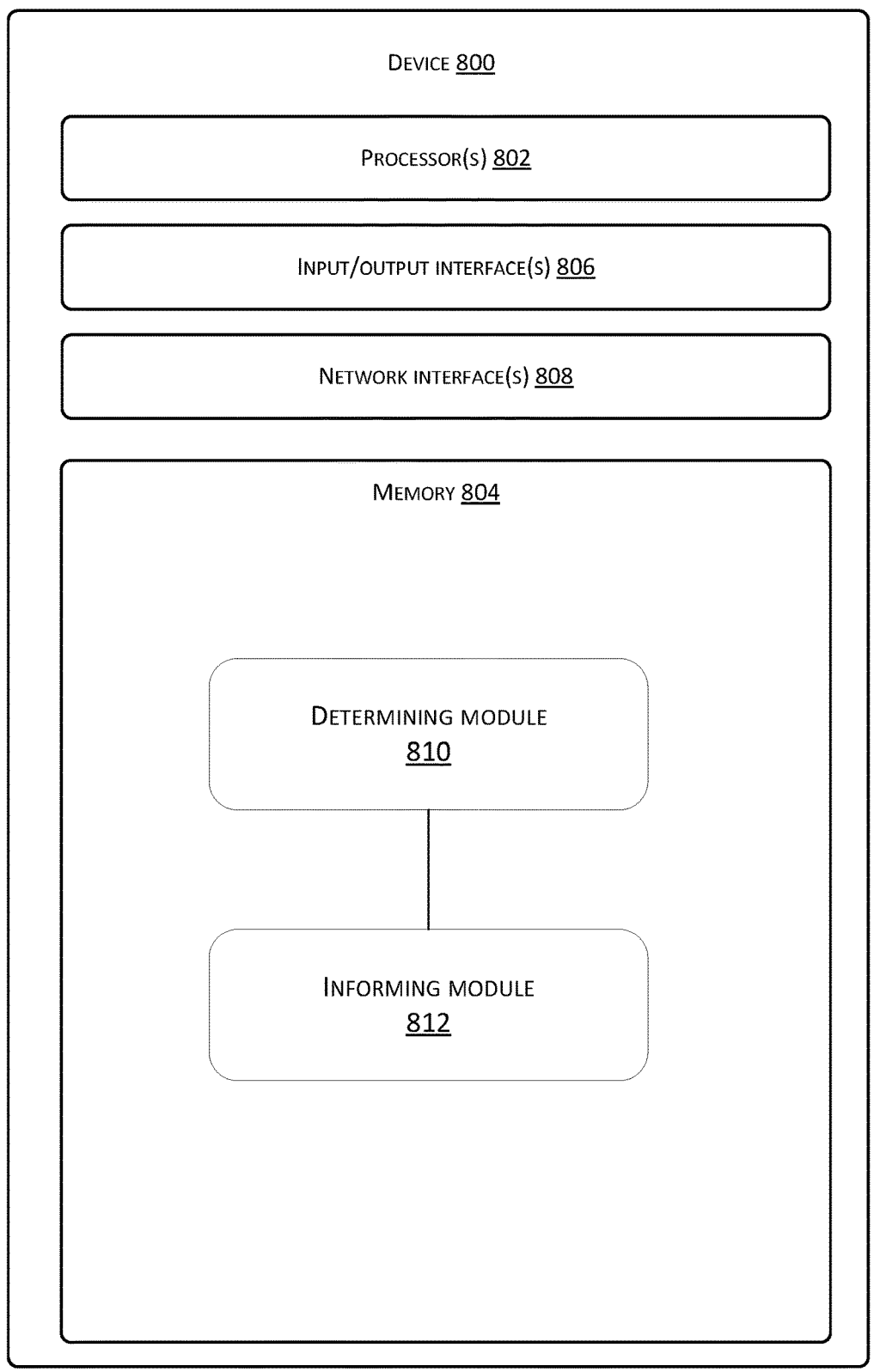
FIG. 8 is a schematic structure diagram of another voice interaction device provided by an embodiment of the present disclosure.

FIG. 8 is a schematic structure diagram of another interaction device provided by an embodiment of the present disclosure. As shown in FIG. 8, the device 800 includes one or more processor(s) 802 or data processing unit(s) and memory 804. The device 800 may further include one or more input/output interface(s) 806 and one or more network interface(s) 808. The memory 804 is an example of computer-readable media.

The memory 804 may store therein a plurality of modules or units including a determining module 810 and an informing module 812.

The determining module 810 is used for, in response to voice information, determining a response object to which corresponding voice information is registered and which occupies an interactive medium.

The informing module 812 is used for informing the response object to respond to the voice information.

Here, the corresponding voice information is the voice information, or the corresponding voice information is semantically similar to the voice information.

For example, the device 800 may further comprise: a receiving module, and a storage module (not shown in FIG. 8) stored in the memory 804.

The receiving module is used for receiving registration information sent by the response object, which contains the corresponding voice information and an identification of the response object.

The storage module is used for storing the registration information.

For example, the determining module 810 may be used for: determining at least one response object to which corresponding voice information is registered in stored registration information; acquiring occupation status information of interactive media, which records occupation information of different interactive media by different response objects; and determining the response object occupying the interactive medium from at least one response object according to the occupation status information.

For example, the determining module 810 may be used for: acquiring occupation status information of interactive media, which records occupation information of different interactive media by different response objects; and determining the response object to which corresponding voice information is registered from the response objects recorded in the occupation status information.

For example, the informing module 812 may be used for: if there are at least two response objects to which corresponding voice information is registered and which occupy an interactive medium, and the at least two response objects occupy at least two interactive media in total, then determining according to the priorities of the at least two interactive media that the response object occupying an interactive medium at the highest priority among the at least two response objects is a target response object, and informing the target response object about responding to the voice information.

For example, the informing module 812 may be used for: if there are at least two response objects to which corresponding voice information is registered and which occupy an interactive medium, then determining according to the time of occupation of the corresponding interactive medium by the at least two response objects, respectively, that the response target last occupying the interactive medium among the at least two response object is a target response object, and informing the target response object of responding to the voice information.

For example, the registration information further contains a user interaction intention corresponding to the corresponding voice information; the informing module 812 may be used for: determining the user interaction intention corresponding to the voice information in the response object; and sending a control instruction corresponding to the user interaction intention to the response object.

The device shown in FIG. 8 may implement the methods provided by embodiments shown in FIG. 2 to FIG. 4. The part not described in detail in this embodiment may refer to the relevant description of the embodiments shown in FIG. 2 to FIG. 4. The implementation process and technical effects of the technical solution are shown in the description in the embodiments shown in FIG. 2 to FIG. 4, which will not be described again here.

In an example design, the structure of the interaction device shown in FIG. 8 may be implemented as an electronic device. As shown in FIG. 9, the electronic device may comprise: a second processor 902 and a second memory 904. An executable code is stored in the second memory 904. When the executable code is executed by the second processor 902, the second processor 902 will implement the interaction methods provided in the embodiments shown in FIG. 2 to FIG. 4.

Further, an embodiment of the present disclosure provides a non-transitory machine-readable storage medium, an executable code is stored in the non-transitory machine-readable storage medium, and when the executable code is executed by the processor of the electronic device, the processor will implement the interaction methods provided in the embodiments shown in FIG. 2 to FIG. 4.

The apparatus embodiments described above are only examples, wherein the units described as separate components may or may not be physically separated, and the components displayed as units may or may not be physical units; that is, the units may be located in one place, or may be distributed on a plurality of network units. Some or all of the modules may be selected according to actual needs to achieve the object of the solution of the embodiments. Those of ordinary skill in the art may understand and implement the embodiments without creative efforts.

Through the description of the above implementations, those skilled in the art may clearly understand that each implementation may be realized by means of a necessary general hardware platform, and may certainly be implemented by a combination of hardware and software. Based on such an understanding, the above technical solutions or the part of the technical solution, which is essential or contributes to the conventional techniques, may be embodied in the form of a software product. The present disclosure may take the form of a computer program product which is embodied on one or more computer-usable storage media (including, but not limited to, disk storage, CD-ROM, optical storage, and so forth) having computer-usable program code included therein.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that may instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable voice interaction device, so that a series of operations and steps are performed on the computer or another programmable device to generate computer-implemented processing. Therefore, the instructions executed on the computer or another programmable device are used to provide steps for implementing a specific function in one or more processes in the flowcharts and/or in one or more blocks in the block diagrams.

In one typical configuration, a computer device comprises one or a plurality of processing units (CPUs), input/output interfaces, network interfaces, and memory.

A memory may include a volatile storage device on a computer-readable medium, a random-access memory (RAM), and/or a non-volatile memory, such as a read-only memory (ROM), or a flash memory (flash RAM). A memory is an example of the computer-readable medium.

Computer-readable media include both permanent and non-permanent, removable and non-removable media, and may store information by any method or technology. The information may be a computer readable instruction, a data structure, a module of a program, or other data. Examples of computer storage media include, but are not limited to, a phase change memory (PRAM), a static random access memory (SRAM), a dynamic random access memory (DRAM), other types of random access memories (RAMs), a read only memory (ROM), an electrically erasable programmable read-only memory (EEPROM), a flash memory or other memory technologies, a compact disk read-only memory (CD-ROM), a digital versatile disc (DVD) or other optical storage devices, a cassette type magnetic tape, a magnetic tape/magnetic disk storage or other magnetic storage devices or any other non-transmission medium, and may be used for storing information accessible by computing devices. As defined herein, the computer-readable media do not include transitory media, such as modulated data signals and carriers.

Finally, it should be noted that the above embodiments are merely used for illustrating, rather than limiting, the technical solutions of the present disclosure. Although the present disclosure is described in detail with reference to the aforementioned embodiments, it should be understood by those of ordinary skill in the art that modifications may still be made to the technical solutions described in the aforementioned embodiments, or equivalent substitutions may be applied to part of the technical features therein; and these modifications or substitutions do not cause the essence of corresponding technical solutions to depart from the spirit and scope of the technical solutions in the embodiments of the present disclosure.

The present disclosure may further be understood with clauses as follows.

Clause 1. An interaction method, wherein the interaction method comprises:
 in response to voice information, determining a response object to which corresponding voice information is registered and which occupies an interactive medium; and
 informing the response object to respond to the voice information.

Clause 2. The method according to clause 1, wherein the corresponding voice information is the voice information, or the corresponding voice information is semantically similar to the voice information.

Clause 3. The method according to clause 1, wherein the method further comprises:
 receiving registration information sent by the response object, which contains the corresponding voice information and an identification of the response object; and
 storing the registration information.

Clause 4. The method according to clause 3, wherein the step of determining a response object to which corresponding voice information is registered and which occupies an interactive medium comprises:
 determining at least one response object to which corresponding voice information is registered in stored registration information;
 acquiring occupation status information of interactive media, which records occupation information of different interactive media by different response objects; and
 determining the response object occupying the interactive medium from at least one response object according to the occupation status information.

Clause 5. The method according to clause 3, wherein the step of determining a response object to which corresponding voice information is registered and which occupies an interactive medium comprises:
 acquiring occupation status information of interactive media, which records occupation information of different interactive media by different response objects; and
 determining the response object to which corresponding voice information is registered from the response objects recorded in the occupation status information.

Clause 6. The method according to any one of clauses 1 to 5, wherein the step of informing the response object of responding to the voice information comprises:
 if there are at least two response objects to which corresponding voice information is registered and which occupy an interactive medium, and the at least two response objects occupy at least two interactive media in total, then determining according to the priorities of the at least two interactive media that the response object occupying an interactive medium at the highest priority among the at least two response objects is a target response object; and
 informing the target response object about responding to the voice information.

Clause 7. The method according to any one of clauses 1 to 5, wherein the step of informing the response object to respond to the voice information comprises:
 if there are at least two response objects to which corresponding voice information is registered and which occupy an interactive medium, then determining according to the time of occupation of the corresponding interactive medium by the at least two response objects, respectively, that the response target last occupying the interactive medium among the at least two response object is a target response object;
 informing the target response object about responding to the voice information.

Clause 8. The method according to clause 3, wherein the registration information further contains a user interaction intention corresponding to the corresponding voice information; and the step of informing the response object to respond to the voice information comprises:
 determining the user interaction intention corresponding to the voice information in the response object; and
 sending a control instruction corresponding to the user interaction intention to the response object.

Clause 9. An interaction method, wherein the interaction method comprises:
 determining registration information of a response object, which contains voice information and an identification of the response object; and
 sending the registration information to an operating system so that the operating system responds to received voice information according to the registration information.

Clause 10. An electronic device, wherein the electronic device comprises a memory and a processor, an executable code is stored in the memory, and when the executable code is executed by the processor, the processor will implement the interaction method described in any one of clauses 1 to 8.

Clause 11. An electronic device, wherein the electronic device comprises a memory and a processor, an executable code is stored in the memory, and when the executable code is executed by the processor, the processor will implement the interaction method described in clause 9.

Clause 12. A non-transitory machine-readable storage medium, wherein an executable code is stored in the non-transitory machine-readable storage medium, and when the executable code is executed by the processor of the electronic device, the processor will implement the interaction method described in any one of clauses 1 to 8.

Clause 13. An operating system, wherein the operating system comprises:
 an input control unit, used for controlling a voice input device to receive voice information; and
 an interaction engine, used for, in response to the voice information, determining a response object to which corresponding voice information is registered and which occupies an interactive medium.

What is claimed is:

1. A method comprising:
 receiving voice information;
 determining a response object to which corresponding voice information is registered and which occupies interactive medium according to a priority among multiple response objects, in response to determining that the voice information triggers multiple response objects, a first response object of the multiple response objects corresponding to a first application, a second response object of the multiple response objects corresponding to a second application, the first application being different from the second application; and
 informing the response object of responding to the voice information.

2. The method according to claim 1, wherein the corresponding voice information is the voice information.

3. The method according to claim 1, wherein the corresponding voice information is semantically similar to the voice information.

4. The method according to claim 1, further comprising:
 receiving registration information sent by the response object; and
 storing the registration information.

5. The method according to claim 4, wherein the registration information includes the corresponding voice information and an identification of the response object.

6. The method according to claim 5, wherein the determining the response object to which the corresponding voice information is registered and which occupies the interactive medium comprises:
 determining at least one response object to which the corresponding voice information is registered in the stored registration information;
 acquiring occupation status information of interactive media that records occupation information of different interactive media by different response objects; and
 determining the response object occupying the interactive medium from at least one response object according to the occupation status information.

7. The method according to claim 4, wherein the determining the response object to which the corresponding voice information is registered and which occupies the interactive medium comprises:
 acquiring occupation status information of interactive media that records occupation information of different interactive media by different response objects; and
 determining the response object to which corresponding voice information is registered from the response objects recorded in the occupation status information.

8. The method according to claim 4, wherein the informing the response object of responding to the voice information comprises:
 determining there are at least two response objects to which corresponding voice information is registered and which occupy at least two interactive media respectively;
 determining, according to priorities of the at least two interactive media that the at least two response objects occupy, a target response object corresponding to an interactive medium with a highest priority; and
 informing the target response object of responding to the voice information.

9. The method according to claim 4, wherein the informing the response object of responding to the voice information comprises:
 determining there are at least two response objects to which corresponding voice information is registered and which occupy at least two interactive media respectively;
 determining, according to a time of occupation of the corresponding interactive medium by the at least two response objects respectively, a target response target that lastly occupies the corresponding interactive medium; and
 informing the target response object of responding to the voice information.

10. The method according to claim 4, wherein the registration information further includes a user interaction intention corresponding to the corresponding voice information.

11. The method according to claim 10, wherein the informing the response object of responding to the voice information comprises:
 determining the user interaction intention corresponding to the voice information for the response object; and
 sending a control instruction corresponding to the user interaction intention to the response object.

12. One or more memories storing thereon computer-readable instructions that, when executed by one or more processors, cause the one or more processors to perform acts comprising:
 determining voice information triggers multiple response objects, a first response object of the multiple response objects corresponding to a first application, a second response object corresponding to a second application, the first application being different from the second application;

determining registration information of a response object among the multiple response objects according to a time of occupation of interactive medium by the first application and the second application respectively, the registration information including voice information and an identification of the response object; and informing the response object of responding to the voice information.

13. The one or more memories according to claim 12, wherein:

the acts further comprise sending the registration information to an operating system; and the operating system responds to received voice information according to the registration information.

14. A device comprising:

one or more processors; and one or more memories storing thereon computer-readable instructions that, when executed by the one or more processors, cause the one or more processors to perform acts comprising:

receiving voice information;

determining a response object to which corresponding voice information is registered and which occupies interactive medium according to a priority among multiple response objects corresponding to multiple different applications, in response to determining that the voice information triggers the multiple response objects, a first response object of the multiple response objects corresponding to a first application, a second response object of the multiple response objects corresponding to a second application, the first application being different from the second application; and informing the response object of responding to the voice information.

15. The device according to claim 14, wherein the corresponding voice information is the voice information or semantically similar to the voice information.

16. The device according to claim 14, wherein the acts further comprise:

receiving registration information sent by the response object; and storing the registration information.

17. The device according to claim 16, wherein the registration information includes the corresponding voice information and an identification of the response object.

18. The device according to claim 17, wherein the determining the response object to which the corresponding voice information is registered and which occupies the interactive medium comprises:

determining at least one response object to which the corresponding voice information is registered in the stored registration information;

acquiring occupation status information of interactive media that records occupation information of different interactive media by different response objects; and determining the response object occupying the interactive medium from at least one response object according to the occupation status information.

19. The device according to claim 16, wherein the determining the response object to which the corresponding voice information is registered and which occupies the interactive medium comprises:

acquiring occupation status information of interactive media that records occupation information of different interactive media by different response objects; and determining the response object to which corresponding voice information is registered from the response objects recorded in the occupation status information.

20. The device according to claim 16, wherein the informing the response object of responding to the voice information comprises:

determining there are at least two response objects to which corresponding voice information is registered and which occupy at least two interactive media respectively;

determining, according to priorities of the at least two interactive media that the at least two response objects occupy, a target response object corresponding to an interactive medium with a highest priority; and informing the target response object of responding to the voice information.

* * * * *